United States Patent [19]

Derman

[11] 3,814,446

[45] June 4, 1974

[54] SEALING ARRANGEMENT

[76] Inventor: Karl Gustav Derman, Sorgardsvagen 7, S-430 70 Savedalen, Sweden

[22] Filed: Jan. 26, 1972

[21] Appl. No.: 220,967

[30] Foreign Application Priority Data
Jan. 26, 1971    Sweden................................ 871/71

[52] U.S. Cl................ 277/169, 308/187.1, 277/212
[51] Int. Cl............................................. F16j 15/32
[58] Field of Search...... 277/169, 212, 212 FB, 165; 308/187.1, 187.2, 184

[56] References Cited
UNITED STATES PATENTS

| | | | |
|---|---|---|---|
| 3,028,203 | 4/1962 | Lund et al. | 308/187.1 |
| 3,169,809 | 2/1965 | Pendelton | 308/187.1 |
| 3,449,029 | 6/1969 | Smith | 208/187.2 |

FOREIGN PATENTS OR APPLICATIONS

| | | |
|---|---|---|
| 1,139,430 | 2/1957 | France |
| 1,169,214 | 4/1964 | Germany |

*Primary Examiner*—Louis R. Prince
*Assistant Examiner*—Robert I. Smith
*Attorney, Agent, or Firm*—Dexter N. Shaw

[57] ABSTRACT

A seal adapted to be mounted between inner and outer members which are rotatable relative to one another, one of said members having opposing sealing surfaces, comprising an annular element having inner and outer portions connected by a flexible membrane, one of said portions defining a locking means for securing the annular element to the other of said members, the other portion of said annular element remote from said one portion defining a sealing element adapted to be compressed axially between opposing sealing surfaces of said one member and comprising two annular sliding sealing faces disposed on opposite sides of said membrane for sliding sealing contact with said sealing surfaces, said membrane being flexible in an axial direction so that the contact pressures of the sliding sealing faces in the axial direction adjust to substantially the same value as each other, at least one of said annular sealing portions comprising an open funnel-shaped sealing lip.

6 Claims, 10 Drawing Figures

SEALING ARRANGEMENT

The present invention relates to a sealing device between two elements, an outer and an inner element, rotatable in relation to each other.

The object for the invention is to provide a sealing device which can be mounted and dismounted in an easy way and is axially and radially movable to a great extent. Furthermore it should be axially self-adjusting so that the seal provides for a low loss of effect independently of the position. It is also desirable that the sealing device can be stretched over flanges and the like on the inner element.

The sealing device according to the invention comprises the following elements known per se. A rubber ring, i.e., a ring of an elastic material, comprising three main portions, i.e., a fastener portion for fixing the ring to the outer element, a radially inner sealing portion for sliding sealing contact with the inner element and finally an intermediate portion connecting the fastener portion to the sealing portion.

The object of the invention is obtained by the fact that the ring has the following features.

The sealing portion is provided with two annular portions disposed at each side of the sealing portions and contacting opposing sealing surfaces on the rotatable element at a substantially axial pressure in opposite directions. The intermediate portion has the form of a membrane which is flexible so that the contact pressures in the opposite directions automatically adjust themselves to substantially the same value.

The invention is described in the following with reference to the accompanying drawings.

Figure 1:
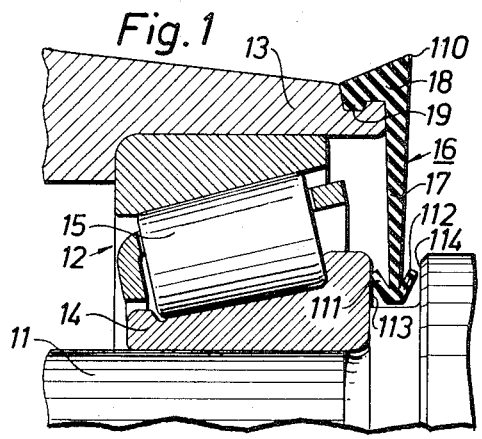
FIGS. 1–6 are sections of different embodiments of the sealing device according to the invention in connection with different types of roller bearings

In FIG. 1 there is shown a shaft 11 rotatably mounted in a bearing housing 13 by means of a taper roller bearing 12. In a bearing of this kind the bearing housing, for example a wheel hub, is very often rotatable, while the shaft is unrotatably mounted in a frame. A bearing of this kind is usually mounted so that the inner ring 14 of the bearing 12 and the roller elements 15 thereof are mounted on the shaft, while the outer ring is mounted on the bearing housing 13. Usually there is used a seal which is fixed to the shaft and is provided with an outwardly directed lip sealingly engaging an inner surface of the bearing housing, so that the bearing housing and the inner ring of the bearing can be axially moved along the shaft at the mounting of the unit. It is of course possible to fix the seal to the bearing housing, but in such a case the sealing must not have less inner diameter than the outer diameter of the roller elements.

In both cases the slide surface of the seal is positioned at a relatively great diameter which is disadvantageous from two points of view. The friction moment is proportional to the square of the diameter, for which reason there is provided an unnecessary great friction loss at great diameters. Besides, the sealing problems are greater at greater diameters. The sealing surface has an increased area, and the so called grease pressure has a greater value. In wheel bearings there is usually used grease as a lubricant.

The sealing device 16 according to the invention obviates all drawbacks present at conventional sealing devices. The sealing device comprises a rubber membrane 17 having an outer peripheral portion 18 formed as an annular bead. The bead is disposed in a notch 19 in a bearing housing 13 and provides a static seal therewith.

The bead is provided with a sharp ridge 110 providing at the rotation a means for throwing away leaking liquids and constituting at periods of rest a throating. From the inner portion of the membrane 17 there extend two lips 11, 112 having peripheral portions sealingly contacting substantially plan annular surfaces 113, 114 at a light compression of the lips. The surface 113 is constituted by the inner ring 14 of the roller bearing, while the surface 114 is constituted by the shaft 11. Thereby, the sealing device shows a multiple function. The outer lip 112 protects the bearing from dirt and water. The membrane 17 constitutes a cover. As the bead 18 is expanded, the whole sealing device is subject to a certain pre-tension having a positive effect on the function of the lips. As the membrane is relatively weak, the sealing lips, 111, 112 will automatically adjust themselves to the same contact pressure against their contact surfaces 113, 114. Thereby the sealing device can adapt to a considerable movement of the shaft in relation to the bearing housing in the axial direction.

Figure 2:
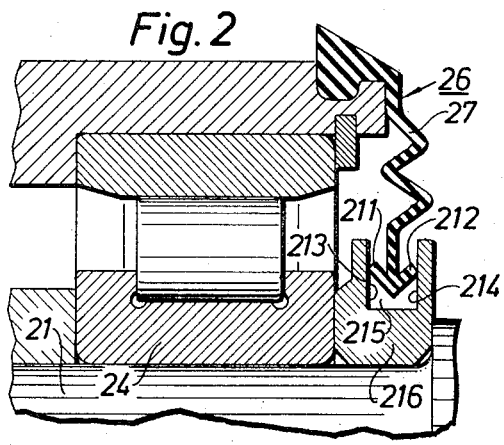

If a greater axial movement is required the membrane can be designed as shown in FIG. 2. Here the membrane 26 has the form of a bellows. The sealing lips 211, 212 are disposed in the notch 215 in a separate metal sealing ring 216 clamped between the inner ring 24 of the bearing 22 and a shoulder on the shaft 21.

Figure 3:
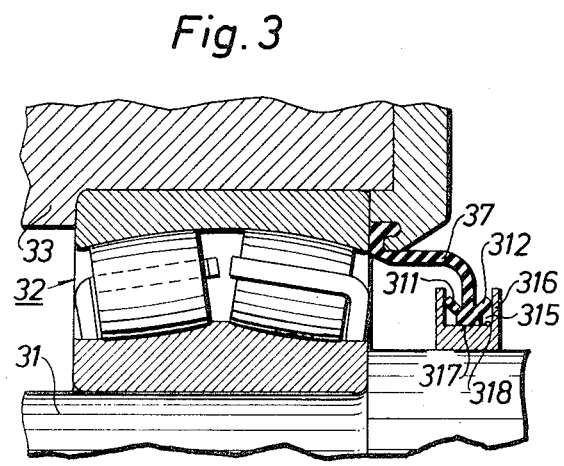

FIG. 3 shows a bearing in which the sealing arrangement according to the invention has decided advantages. The figure shows a spherical bearing 32 mounted on a shaft 31. As the bearing housing 33 can take an inclined position in relation to the shaft 31, also the position of the sealing lips 311, 312 can be eccentric in relation to the sealing ring 316. In order to obviate the eccentricity the inner portion of the rubber membrane 37 is provided with a guiding surface 317, sliding against a co-operating surface 318 constituting the bottom of the notch 315 in the sealing ring 316. The membrane is curved in order to take up a swinging motion or an inclination of the shaft in relation to the bearing housing. The sealing surfaces 113, 114 of FIG. 1 and 213, 214 of FIG. 2 have been shown quite plan. As appearing from FIG. 3 said surfaces can be conical or bowl-shaped or have arbitrary shape. However, the lips shall contact their sealing surfaces with axially directed forces so that they are somewhat pressed together.

Figure 4:
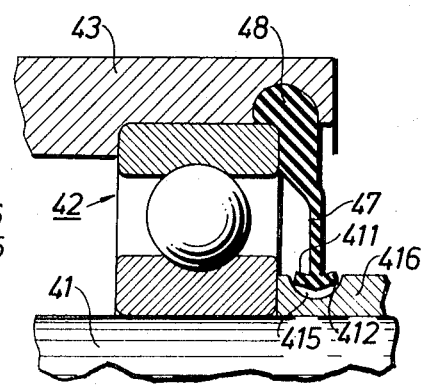

Bearings for transport rolls must be protected from dust, dirt and liquids from the outside and grease leakage from the inside. The sealing devices should be cheap and constitute a cover by themself. In bearings of this kind a sealing device according to the invention is very advantageous, as appears from FIG. 4. On the shaft 41 which is disposed in a cheap roller bearing 42 there is a spacing sleeve 416 in which there is formed a notch 415 having a substantially semi-circular section. In the initial stage the lips 411, 412 have an almost cylindrical shape. When they are mounted in the notch 415, the lips become a slightly conical shape. The membrane 47 is thickened at its periphery for constituting a bead 48 which is in the mounted position clamped between the outer ring of the bearing 42 and the bearing housing 43 which in this case is constituted by the housing of the transport roller.

Figure 5:
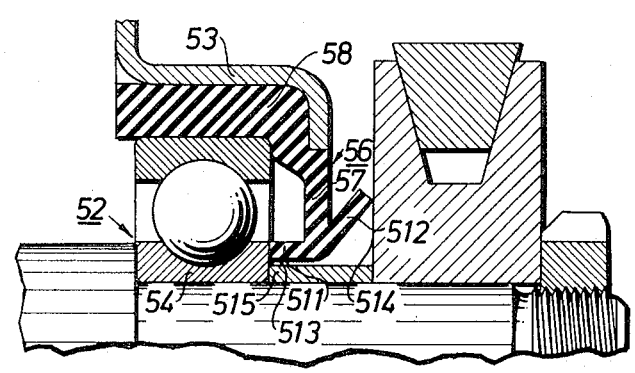

In certain types of bearing arrangements, for example in fans, the bearing is positioned in a rubber body. FIG. 5 shows a bearing wherein the bead-shaped outer portion 48 of the bearing 46 is formed as a rubber sleeve pressed into or vulcanized to a bearing sleeve of sheet metal 53. The bearing 52 is pressed into the rubber sleeve. At its inner portion the membrane 57 is provided with two sealing lips 511 and 512 pointing in opposite directions, said lip 512 being funnel-shaped and contacting a surface 514 for the sealing edge, constituted by a pulley 516 and said lip 511 being substantially cylindrical and contacting a surface 513 on the inner ring 54 of the bearing. The distance between said inner ring and the pulley is maintained by means of a spacing ring 515 having a width which is slightly less than the axial distance between the sealing edges of the lips so that a sufficient sealing pressure is obtained between the sealing lips 511, 512 and the surfaces 513 and 514, respectively.

Figure 6:
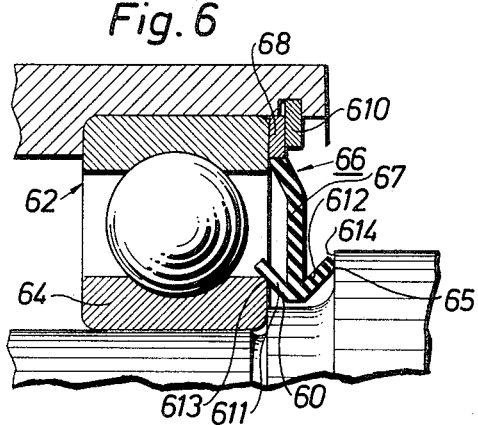

A sealing arrangement 66 according to FIG. 6 differs from the embodiments previously described by the fact that the membrane portion 67 is vulcanized to a metal ring 68 which in turn is mounted between the outer ring of the bearing 72 and a locking ring 610. Another substantial difference is the arrangement of the lips 611 and 612. While the lip 612 by means of its sealing edge 65 contacts its surface 614 with an axial pressure, the lip 611 rests against its surface 613 with its funnel-shaped surface 60, said surface 613 being constituted by the chamfered edge of the inner ring 64. Also in this case the sealing lips adjust themselves to a friction resistance which is as low as possible.

Figure 7:
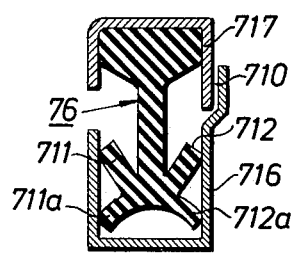
FIG. 7 is a section of a sealing unit.

The embodiments previously described have been used in different types of bearing arrangements. FIG. 7 shows a sealing unit ready to be built into a machine construction. The unit comprises a sheet metal ring 716 having a U-shaped section which is open in a radially outward direction. The rubber seal 76 is vulcanized to a sheet metal ring 717 having a L-shaped section. The lips 711, 712 comprise two further lips 711a and 712a also funnel-shaped but pointing in the opposite direction. Together the sheet metal rings 716 and 717 constitute a labyrinth.

Figure 8:
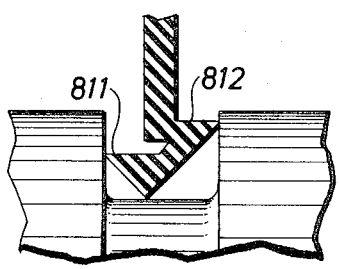
FIGS. 8–10 show different designs of the sealing portion of the rubber ring.
Figure 9:
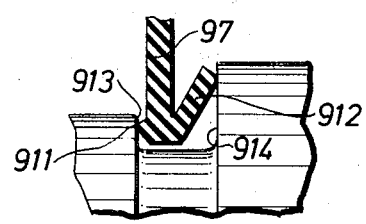
Figure 10:
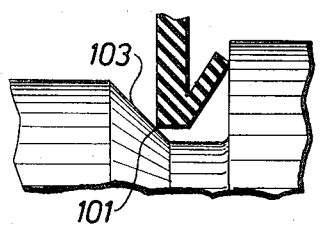

FIGS. 8-10 show different designs of the lips at the sealing arrangements according to the invention. FIG. 8 shows a lip arrangement which is advantageous from the point of manufacturing as it is possible to manufacture the arrangement in a two-part mould without any negative clearance or loose inserts. The lips 811 and 812 are positioned at different diameters forming a zigzag shaped section.

FIG. 9 shows the design of a seal intended to function as a grease valve. In the usual manner the inner portion of the membrane 97 is provided with a lip 912 contacting a surface 914, while the lip at the opposite side is stunted to a low annular ridge 911 resting against a surface 913. At an overpressure grease can pass between the surface 913 and the ridge 911 and therefrom out between the lip 912 and the opposite surface 914. This type of sealing arrangement can be used when there is a risk for the building up of an overpressure in the bearing housing which is not desirable.

A similar arrangement with the same function is shown in FIG. 10. In FIG. 10 the ridge 911 is replaced by an edge 101 contacting a conical surface 103.

The invention is not restricted to the embodiments shown in the drawings but can be modified within the scope of the following claims. Thus, it is of course possible to provide more than one lip at each side of the membrane without departing from the scope of the invention.

I claim:

1. A seal adapted to be mounted between inner and outer members which are rotatable relative to one another, one of said members having opposing sealing surfaces, comprising an annular element having inner and outer portions connected by a flexible membrane, one of said portions defining a locking means for securing the annular element to the other of said members, the other portion of said annular element remote from said one portion defining a sealing element adapted to be compressed axially between opposing sealing surfaces of said one member and comprising two annular sliding sealing faces disposed on opposite sides of said membrane for sliding sealing contact with said sealing surfaces, said membrane being flexible in an axial direction so that the contact pressures of the sliding sealing faces in the axial direction adjust to substantially the same value as each other, at least one of said annular sealing portions comprising a frustoconical sealing lip inclined toward the other of said members.

2. A seal as claimed in claim 6 wherein said sealing lips diverge upwardly and outwardly in opposite directions relative to said membrane.

3. A seal as claimed in claim 1 wherein said membrane is in the form of a bellows.

4. A seal as claimed in claim 1 wherein one of said annular sealing portions comprises a substantially cylindrical sealing lip.

5. A seal as claimed in claim 1 wherein said sealing element is provided with a cylindrical surface adapted to contact an outer cylindrical surface of said inner member in order to position the seal in the radial direction.

6. A seal as claimed in claim 1 wherein the sealing faces are positioned at different diameters.

* * * * *